Figure 4:
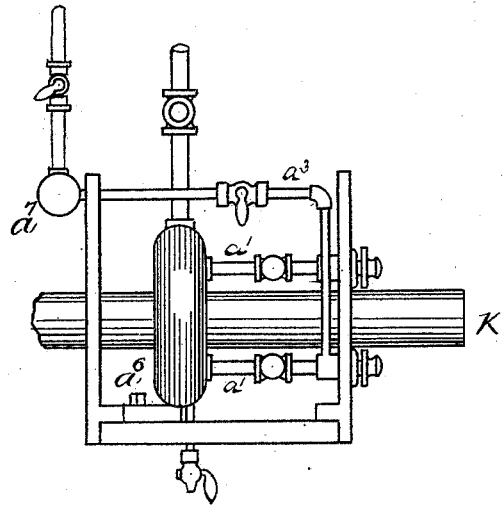

(No Model.) 3 Sheets—Sheet 1.
S. H. COCHRAN.
PROCESS OF AND APPARATUS FOR OBTAINING METALS FROM THEIR ORES.
No. 491,638. Patented Feb. 14, 1893.
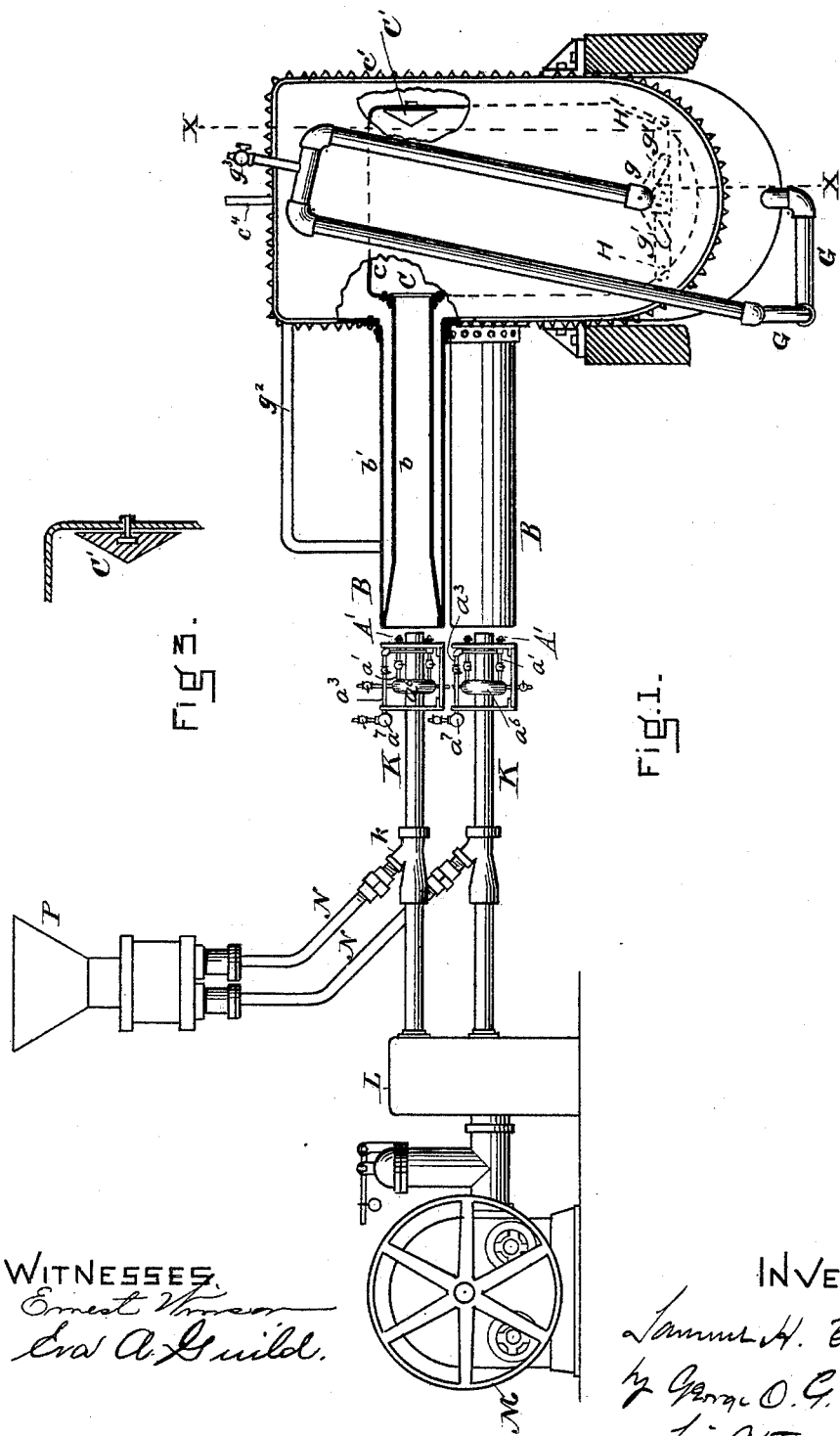

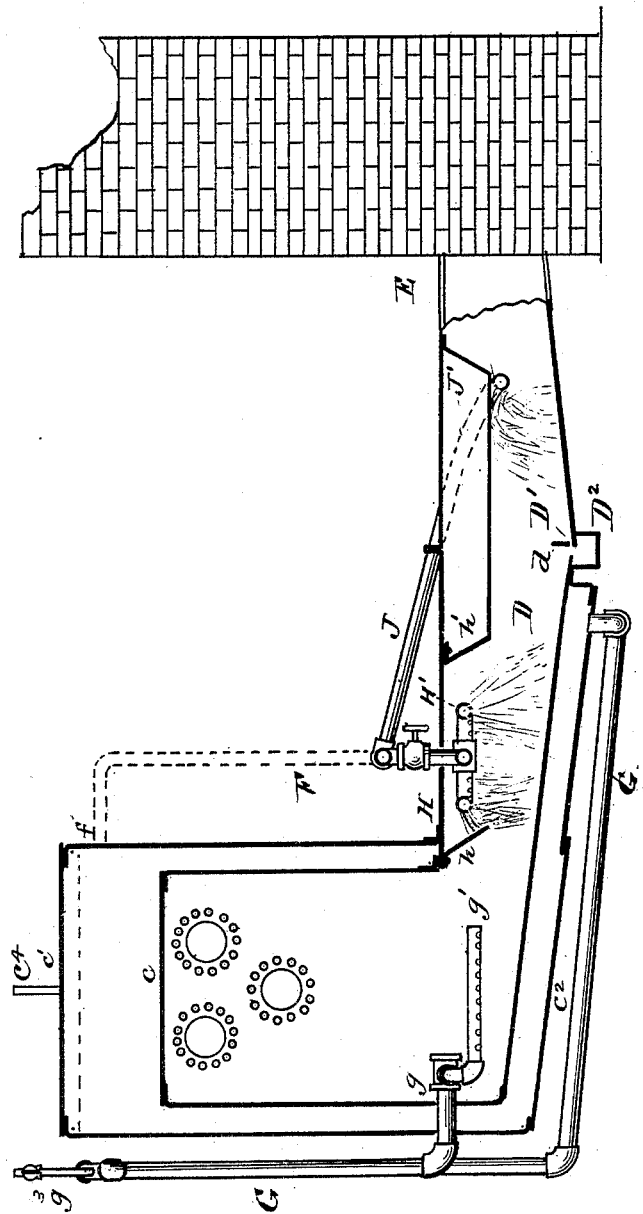

(No Model.) 3 Sheets—Sheet 3.

S. H. COCHRAN.
PROCESS OF AND APPARATUS FOR OBTAINING METALS FROM THEIR ORES.

No. 491,638. Patented Feb. 14, 1893.

WITNESSES
Eva A. Guild
Joseph Desmond

INVENTOR
Samuel H. Cochran

UNITED STATES PATENT OFFICE.

SAMUEL H. COCHRAN, OF EVERETT, MASSACHUSETTS, ASSIGNOR TO THE COCHRAN GOLD AND SILVER RELEASING AND STEAM GENERATING COMPANY, OF MAINE.

PROCESS OF AND APPARATUS FOR OBTAINING METALS FROM THEIR ORES.

SPECIFICATION forming part of Letters Patent No. 491,638, dated February 14, 1893.

Application filed December 26, 1889. Serial No. 334,965. (No model.)

*To all whom it may concern:*

Be it known that I, SAMUEL H. COCHRAN, of Everett, in the county of Middlesex and State of Massachusetts, have invented a new and useful Improvement in Processes of and Machines for Obtaining Metals from their Ores, of which the following is a specification.

The purpose of my invention is to obtain from ores a higher percentage of precious and other metals by making the most economical use of an intensely hot flame, decomposing and burning the impurities out of the ores. This I accomplish by forcing the ore which has been pulverized as finely as practicable, through an intense oxidizing flame by means of a blast, which feeding the pulverized ore to the flame, conveys it through the flame with a large amount of air so that each particle is exposed to the action of the fire, the blast assisting in obtaining perfect combustion and a corresponding degree of heat by supplying the flame with oxygen.

The next step in my process consists in passing the products of combustion, impurities and the metals, whether solid or vaporized under the control of the blast, through one or more sheets of water while the particles of ore are still at an intense heat, by means of which the vaporized portions are condensed, thus preventing the danger of loss of the metals by vaporization, the solids being collected and submitted to such further treatment as may be thought best, for example by amalgamation or concentration &c.

The result of my process is to suddenly expand any gases which the particles of ore may contain, thus fracturing the particles so that a large amount of the metals is set free and at the same time to burn off the impurities and to condense all the vaporized solids so that nothing of value escapes with the gases, which are thrown off as a result of the combustion.

This process has been used in the treatment of gold and silver ores, but I do not mean to limit my process at present to their treatment, as there are undoubtedly other ores which can be satisfactorily treated in the way hereinafter described, but which without full experiment I cannot now name.

This process has not been practiced before so far as I know, as in none of the prior methods of treating ores known to me, has each particle of ore been brought into intimate contact with an intense flame which is fed with oxygen from the air blast carrying the ore, which having been fractured and expanded while under the influence of this intense heat, whether in a solid or vaporized condition, is conveyed by the force of the same blast into a condensing chamber under a sheet of water, which throws down all the products of combustion and allows all the worthless gases to filter through and to escape while all the solids are conveyed away for further treatment.

The process may best be carried out by means of the machine hereinafter described, in which the air blast carrying the pulverized ore, is forced with the flame and with or without considerable atmospheric air, through a flue or flues of comparatively small diameter, into a combustion chamber where the ore is given a sudden change of direction by causing it to strike an opposing surface, whereby it is still more thoroughly united with the flame and then almost immediately causing it to pass through one or more sheets of water located in such close proximity to said opposing surface that the products of combustion are at substantially their greatest temperature when they reach the water.

My invention consists therefore in treating ores as follows, viz:—transporting pulverized ore through an intensely hot broom of flame by means of a blast of air blended with atomized or gaseous fuel in such proportions and under such pressure as to induce a primary reducing action and secondary oxidation effect, which are subsequently re-enforced by sudden contact with atomized or liquid cold water for the purpose of disintegrating and obstructing the intimacy and affinities between the reduced noble metals and the oxidized base metals, and thereby facilitate their subsequent separation by the useful methods pursued for that object.

It also consists in a machine more fully described below by means of which my process can be carried out in which the mouth of the blast tube by which the pulverized ore is conveyed, and the mouth or mouths of the furnaces which are to furnish flame for the purpose of reducing the ore, are located in close proximity to the open mouth of a combustion flue which shall receive the contents of the blast tube and the products of combustion and thoroughly unite them and convey them to a combustion chamber, thence to a condensing chamber where the vapors will be condensed and the solids collected before any recombination of the precious metals with the impurities.

It also consists in certain details of construction more fully described below.

Figure 5:
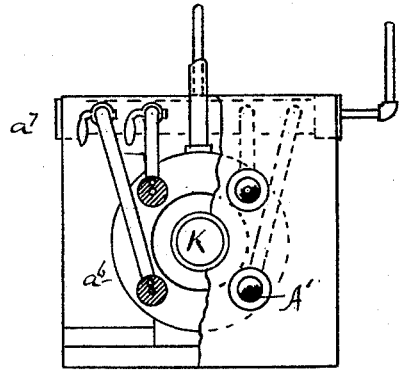
Figure 6:
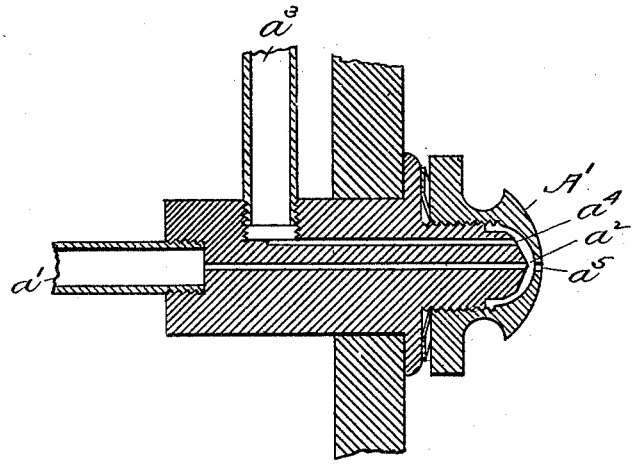

In the drawings Figure 1 is a side elevation of a device embodying my invention, part of it being shown in section, and Fig. 2 is a section of my device taken on the line $x$, $x$ of Fig. 1. Fig. 3 is a detail showing the header referred to below. Fig. 4 is a side elevation and Fig. 5 is a front elevation partly in section, of one of the furnaces described below, Fig. 6 being a section, full size, of one of the nozzles or burners.

I have found the most convenient and economical form of furnace for use in treating ore, is one adapted for burning crude petroleum which has been atomized, thus giving an intense oxy-hydro-carbon flame. I have shown such furnaces located at A in front of flues B leading into a combustion chamber C. These furnaces are shown in detail in Figs. 4, 5, and 6. They consist (in brief) of a steam or compressed air pipe $a'$ terminating in a passage $a^2$, passing through the center of the nozzle A'. $a^3$ is a pipe leading from an oil reservoir which feeds oil into the passage $a^4$.

The nozzle proper A' consists of a cap having through its center opposite the end of the passage $a^2$, a hole $a^5$ through which the oil which leaks down from the end of the passage $a^4$, is blown by the steam or compressed air into spray which is burned and forms the source of heat. These pipes $a'$ and $a^3$ are provided with suitable stop cocks for regulating the flow of steam and oil from the steam chamber $a^6$ and the oil chamber $a^7$ respectively, each of which is connected by suitable pipes, with a source of constant supply.

To protect the wall of the combustion chamber, I prefer to provide this chamber with headers C' or thick pieces of iron each located in front of the end of one of the flues B and being so constructed that they may easily be replaced. This combustion chamber C has a condensing chamber D leading therefrom as shown in Fig. 2. Each end of the floor of this condensing chamber is sloping as shown. At D', its lowest point, there is located an opening into a suitable trough $D^2$ for collecting and conveying to a suitable receptacle the solid and liquid contents of the chamber, while the uncondensible vapors having passed through the water, pass off up the chimney. To direct the flow of the liquid into the trough $D^2$ a low gate $d$ is provided extending across the chamber.

It is evident that the combustion flues B and the combustion chamber C should be so constructed as to withstand a very great amount of heat, and for this purpose I have found it desirable to make them of boiler iron, surrounding each of them with a water jacket.

In the machine shown in the drawings, $b$ is an inner tube having a flaring mouth to receive the ore and flame from the furnace A, together with a current of air, which the blast carrying the ore and the flame sucks in about them and which drawn in on all sides helps to concentrate the ore and flame furnishing abundant oxygen for combustion and also preventing the ore from touching the sides of the flue. The inner end of this tube $b$ is riveted to the inner wall $c$ of the chamber C. Around this tube $b$ is placed the tube $b'$. It is riveted at one end to the conical end of the tube $b$ and its inner end is riveted to the wall $c'$ of a chamber, about the chamber C. I also provide a similar jacket $c^2$ for the lower part $c^3$ of the condensing chamber D, thus forming a water chamber which opens into the chamber between the walls $c$, $c'$.

In practice for the tube $b$, I prefer to use a tube eight inches in diameter, and for the tube $b'$ a tube of twelve inches in diameter. In the same manner I make the chamber C of a box $c$ surrounded by a box $c'$ which forms with the box $c$ a water tight chamber. I supply this chamber which is thus formed between the tube $b$ and the tube $b'$, the walls $c$, $c'$ of the combustion chamber C, and the walls $c^2$, $c^3$ of the chamber D with water from a pipe F which passes into the water chamber at $f$.

G is the waste pipe which takes the water from the bottom of the water chamber and conveys it up to a height equal to the level which it is desired to maintain in the water chamber and then carries it down and through both walls $c$, $c'$ at $g$ and there feeds two sprayers $g'$, $g'$ which furnish part of the water with which the vapors are condensed. The pipe F also feeds two sprayers H, H' which extend the width of the lower chamber D and also by means of the pipe J, a third sprayer J'. The sprayers H, H' are each located behind a shield or deflector $h$, $h'$ which prevents too great scattering of the water. The shield $h$ receives the contents of the sprayer H which falls in a nearly solid sheet, thus forming a body of water through which all the products of combustion must pass.

$g^2$ is a pipe leading from the water chamber between the tubes $b$ $b'$ to the water chamber between the walls $c$ $c'$ so as to allow the escape of steam from the chamber about the flue.

$c^4$ is an opening in the top of the wall $c'$ to allow escape of steam from the water chamber, and $g^3$ is a small open pipe to prevent siphonage in the pipe G.

K is the tube which is fed from an air tank

L provided with a suitable safety valve. A high pressure of air is kept up in the air tank L by a blower M. The tank is useful to maintain a steady pressure, though its use is not necessary.

Into the tube K at *k* enters the tube N which feeds the pulverized ore from a hopper P. It is best to diminish the diameter of the tube K at *k* where the ore feeding tube N joins it in order that the pulverized ore may be more effectively drawn into the tube K and thrown into the flue B.

The furnaces A preferably consist of four burners *a* of the kind described, located about the tube K. The action of these various parts is such that flames are thrown from the various burners into the mouth of one of the flues B together with the blast from the blower through the pipe K. Because of the location of the furnaces A and the end of the tube K with reference to the open mouth of the flue A, there will also be drawn into the flue A a considerable amount of air so that there will be supplied to the furnaces a very large amount of oxygen to assist in the combustion of the fuel. I also prefer to use the tubes K in the manner described as the means of feeding the pulverized ore into the flues B, the blast caused by the blower thereby feeding the pulverized ore through the center of the flame and conveying it in contact with the flame from the time it enters the flame until it is thrown down by the water. By this means the entire heat of the flame is utilized and the ore is united with the flame and thoroughly decomposed.

The operation of my apparatus is as follows:—The jackets about the flues B and the chambers C D are filled with water. It is kept in constant circulation through the entire process in order to keep the apparatus sufficiently cool. The burners are next lighted and allowed to burn until thorough combustion is established. The ore having been pulverized, is drawn from the hopper P into the tubes K and fed into the outer end of the flues B as above described, into which also is fed the flames from the furnaces. This blast also carries in a large amount of air and assists combustion and as a result, the pulverized ore is thoroughly decomposed the impurities being burned out of it. The mass of flame and ore are carried into the chamber C where they strike the opposite wall or header C', if there is one, and is thereupon more or less broken up, this action assisting to bring each particle of ore into more intimate contact with the flame. It then is carried into the condensing chamber D. The heavier particles of the ore fall directly from the chamber C into the bottom of the chamber D where it is carried along the bottom of the chamber D by the water from the sprayers *g'*, *g'*. The lighter ore still carried by the blast, is thrown down by the sheet of water from these sprayers and the sprayers H into the stream in the bottom of the chamber. The water from these sprayers also condenses the vaporized portions of the ore, carrying them into the stream in the bottom of the chamber D so that it is almost impossible for anything of value to escape. The smoke and worthless gases which have been washed by the water, pass off by the chimney E.

The chamber C is desirable because it causes a more thorough mixture of the products of combustion and the pulverized ore, but both it and the flues must be of such dimensions that the ore will reach the condensing chamber while at its greatest temperature. With certain ores and under certain circumstances, good results may be obtained by causing a flue B to pass directly into a condensing chamber like chamber D, and in this case the flue B may either be straight or may be bent.

What I claim as my invention is,

1. The process herein described for preparing ores to facilitate the extraction and separation of the noble metals from their base associates, which consists, first, in conveying the pulverized ore by means of a violent air blast with which it is thoroughly commingled through a combustion chamber of small diameter and against an opposing surface in the presence of an intense flame, whereby the particles of ore are submitted to and commingle with the flames, and while still commingled therewith, are cracked and rubbed by friction and impact, thereby causing a reduction and condensation in the first instance of the said noble metals not subject to the subsequent oxidizing action, and also the secondary oxidization of the base metals, and second, in plunging the said particles thereafter and while still at an intense heat, into cold water, whereby oxidation of the baser metals is completed while the condition of the noble metals is unchanged, all as set forth.

2. A combustion flue having one tunnel shaped mouth open to the atmosphere, in combination with a furnace A, a blast pipe, means for supplying air to said blast pipe and a feeder connected to said blast pipe substantially as described whereby pulverized ore may be fed thereto, the mouth of said blast pipe and of said furnace being located in front of and in close proximity to the open mouth of said combustion flue, all substantially as described.

3. In combination with a combustion flue having one mouth open to the atmosphere, a furnace located in close proximity to said mouth and means for feeding to said flue in a direction parallel with its axis, the substance to be treated, and the combustion chamber C provided with a wall located in close proximity and opposite to the inner end of said combustion flue, and means substantially as described whereby the material which passes from the combustion chamber is collected, all as set forth.

4. In an ore decomposer, in combination with the burner of the kind described, one or more jacketed flues and a jacketed combustion chamber, provided with a water inlet and outlet and connected as described, whereby a constant circulation of water may be maintained between said water inlet and outlet, and a condensing chamber of substantially the kind described located to receive the contents of said combustion chamber, all as set forth.

5. In an ore decomposer, in combination, one or more burners or furnaces of the kind described, one or more jacketed flues each located in front of one of said burners and adapted to receive the products of combustion therefrom, a jacketed combustion chamber located to receive the contents of said flues and provided with a water inlet and outlet connected as described, whereby a constant circulation of water may be maintained in its jacket between said water inlet and outlet and a condensing chamber of substantially the kind described located to receive the contents of said combustion chamber, all as set forth.

6. In an ore decomposer, in combination with a burner and combustion chamber both of the kind described, the condensing chamber above described having an entrance for the products of combustion and an outlet for the escape of gases and provided with a sloping floor, a water inlet located at the highest part of said floor, a second water inlet located between said entrance for the products of combustion and outlet for the gases and provided with one or more partitions whereby its cross area may be partially closed, all as set forth.

In testimony whereof I have hereunto subscribed my name this 6th day of December, A. D. 1889.

SAMUEL H. COCHRAN.

Witnesses:
HENRY SAWYER,
GEORGE O. G. COALE.